(12) United States Patent
Jensen et al.

(10) Patent No.: US 9,322,445 B2
(45) Date of Patent: Apr. 26, 2016

(54) DEVICE FOR CONTROLLING A CLAMPING FORCE

(71) Applicant: HARBO & HINTZE S.M.B.A., Assens (DK)

(72) Inventors: Tommy Sand Jensen, Valby (DK); Anders Harbo Larsen, Odense SV (DK)

(73) Assignee: HARBO & HINTZE S.M.B.A., Assens (DK)

( * ) Notice: Subject to any disclaimer, the term of this patent is extended or adjusted under 35 U.S.C. 154(b) by 119 days.

(21) Appl. No.: 14/374,252

(22) PCT Filed: Jan. 25, 2013

(86) PCT No.: PCT/DK2013/000012
§ 371 (c)(1),
(2) Date: Jul. 24, 2014

(87) PCT Pub. No.: WO2013/110275
PCT Pub. Date: Aug. 1, 2013

(65) Prior Publication Data
US 2015/0034428 A1 Feb. 5, 2015

(30) Foreign Application Priority Data

Jan. 25, 2012 (DK) ................................ 2012 00069

(51) Int. Cl.
| | | |
|---|---|---|
| *F16D 65/18* | (2006.01) | |
| *F16D 55/226* | (2006.01) | |
| *B66B 5/18* | (2006.01) | |
| *B66D 5/22* | (2006.01) | |

(Continued)

(52) U.S. Cl.
CPC . *F16D 65/18* (2013.01); *B66B 5/18* (2013.01); *B66D 5/14* (2013.01); *B66D 5/22* (2013.01); *F16D 55/226* (2013.01); *F16D 55/2245* (2013.01); *F16D 2121/22* (2013.01); *F16D 2125/68* (2013.01); *F16D 2127/008* (2013.01)

(58) Field of Classification Search
CPC ... F16D 65/18; F16D 55/226; F16D 55/2245; F16D 2121/22; F16D 2125/68; F16D 2127/008; B66B 1/26; B66B 1/32
USPC ...................... 188/44, 171, 189; 335/249, 251
See application file for complete search history.

(56) References Cited

U.S. PATENT DOCUMENTS

| | | | | |
|---|---|---|---|---|
| 837,853 | A * | 12/1906 | Larson | .................... H01F 7/088 |
| | | | | 188/171 |
| 1,837,853 | A | 12/1906 | Larson | |
| 3,373,620 | A * | 3/1968 | Jordan | .................... F16D 49/16 |
| | | | | 188/171 |

(Continued)

FOREIGN PATENT DOCUMENTS

| | | |
|---|---|---|
| CH | 684190 | 7/1994 |
| DE | 19825683 | 7/1999 |

(Continued)

OTHER PUBLICATIONS

International Search Report for PCT/DK2013/000012, Completed by the Swedish Patent Office on May 28, 2013, 5 Pages.

*Primary Examiner* — Anna Momper
*Assistant Examiner* — San Aung
(74) *Attorney, Agent, or Firm* — Brooks Kushman P.C.

(57) ABSTRACT

A clamp with a tripping mechanism in which the force for ensuring safe tripping is obtained via a compound lever mechanism directly from the energy storage element (S), such as a spring, that provides the clamping force.

11 Claims, 6 Drawing Sheets

(51) Int. Cl.
  *B66D 5/14* (2006.01)
  *F16D 55/224* (2006.01)
  *F16D 121/22* (2012.01)
  *F16D 125/68* (2012.01)
  *F16D 127/00* (2012.01)

(56) References Cited

U.S. PATENT DOCUMENTS 3,635,315 A * 1/1972 Shalders ................ B66B 5/22
                                                                188/189
5,819,879 A * 10/1998 Lang ...................... B66B 5/18
                                                                187/370
6,318,505 B1   11/2001 De Angelis
8,448,758 B2 *  5/2013 Xie ........................ B66D 5/08
                                                                188/161

FOREIGN PATENT DOCUMENTS

DE   102006003132   8/2007
DE   102006024023   11/2007
WO      0144677     6/2001

* cited by examiner

DEVICE FOR CONTROLLING A CLAMPING FORCE

A device for controlling a clamping force.

CROSS-REFERENCE TO RELATED APPLICATION

This application is the U.S. national phase of PCT Application No. PCT/DK2013/000012 filed on Jan. 25, 2013, which claims priority to Denmark Patent Application No. PA 2012 00069 filed on Jan. 25, 2012, the disclosures of which are incorporated in their entirety by reference herein.

The invention relates to a device for controlling the application of a clamping force through a clamp to an element that is free to move relative to the clamp when it is not clamped, comprising at least one energy storage element providing the clamping force, a mechanism for opening the clamp comprising at least one element acting as a lever having a short and a long arm, in which the long arm is activated by a wedge arrangement comprising a nut moved by a screw rod, and a tripping arrangement causing instant application of the clamping force.

Tripping arrangements to obtain instant application of a clamping force are known in connection with safety brakes on e.g. wind turbines and in lifts (US: elevators). DE10206024023A1 describes a number of brakes used in wind turbines, both for emergency braking of the turbine itself and for holding the nacelle in place to hold the turbine into the wind. However, the technical contribution of this patent relates specifically to braking the nacelle and is not suitable for an emergency brake.

DE102006003132A1 describes a quick-release brake using wedges driven between rollers by an eccentric to obtain the release. However, there is no indication of the application of the clamping force from an energy storage element.

DE19825683A1 describes a disc brake for a vehicle, in which there is provided a quick-release mechanism for an otherwise hydraulically activated brake. For emergency purposes a pull-cord arrangement for a self-locking knee-lever mechanism is provided, pulling the knee-lever past its straight position. However, the mechanism is dependent on an outside force.

These problems are avoided in a device according to the invention, which is particular in that the tripping mechanism is biased to trip by means of a force that is directly derived from the energy storage element via the mechanism for opening the clamp. This biasing means that the device is completely independent of outside forces to instantly establish the clamping force. The force of the energy storage element is converted by sequential lever and wedge action into a force that is small enough to be sustained by a light-weight element that permits quick action.

Described differently, the bias force is the weak force available via the combined lever action of the opening mechanism for the clamp, and this weak force is resisted by a mechanical element that is supported until the support is removed in the tripping action. In the special type of clamp that is termed a brake, the energy storage is frequently provided as a pressure accumulator acting on a hydraulic fluid, which acts on a hydraulic cylinder with a piston. However, such energy storage requires maintenance because of leakage between the piston and the cylinder. For this reason it is preferable to use an energy storage element that is completely independent upon sealing, such as a compression spring.

An advantageous embodiment of the invention is particular in that the nut is adapted to be releasably locked to the wedge arrangement. This enables a separation of the elements required for opening the clamp and for the tripped release of the energy storage element.

A further advantageous embodiment of the invention is particular in that the nut is capable of being locked to a slideable support, which, being a part of the wedge arrangement, is adapted to carry at least one roller for cooperation with an inclined flank on the long arm of the lever. The wedge arrangement is essentially constituted by the inclined flank cooperating with the roller. This is an embodiment that is both able to reliably withstand the forces involved in opening the clamp and to provide the separation of the elements that permit quick tripping.

A further advantageous embodiment of the invention is particular in that the tripping mechanism comprises at least one further wedge, which is adapted to lock the wedge arrangement to the nut, said at least one further wedge being maintained in its engaged position by an almost straightened-out knee-lever mechanism constituting a collapsible column and adapted to be positively held in its position of rest by a holder that is released when the clamping force is to be applied. This embodiment uses an advantageous way of locking the nut to the lever-and-wedge arrangement, and because the locking is by means of at least one further wedge, this will move away and release the nut due to the inclined surfaces and the force from the energy storage element. The further wedge will not move, however, until it can, and that is only after its supporting structure in the form of a knee-lever has collapsed. In order that no other force than that derived from the energy storage device is assuring this collapse, the knee-lever has not passed the straightened-out position to reach the position of rest. Passing the straightened-out position would effectively have entailed a self-locking mechanism that would not be releasable by the stored force alone. The present position of rest has to be positively maintained by a force, and disappearance of this force constitutes the tripping that causes the collapse of the knee-lever and the consequent un-coupling of the mechanism for opening the clamp. The force needed to maintain the knee in the position of rest is dependent on the relative angular position of the parts of the knee-lever, in other words, how straightened-out it is.

A further advantageous embodiment of the invention is particular in that the holder for the rest position of the knee lever mechanism is an electromagnet. In this embodiment the force to maintain the position of rest is provided by an electromagnet acting on a ferromagnetic part of the knee-lever structure.

A further advantageous embodiment of the invention is particular in that the holder for the rest position is a strap that connects the knee of the knee lever to a stationary element in the device and having an extractable locking pin in a hole. In this embodiment the force to maintain the position of rest is provided by a simple strap, which may be disconnected by the pulling of a locking pin. The force to be withstood by the strap is no larger than the few tens of kilonewtons provided by the corresponding electromagnetic holding means.

A further advantageous embodiment of the invention is particular in that the clamp is a brake caliper and the moveable element is a brake disc. In this embodiment the clamp is provided with the brake pads required and the moveable element is a corresponding brake disc.

A further advantageous embodiment of the invention is particular in that the clamp is a brake caliper and the moveable element is a straight and flat bar. In this embodiment the clamp is provided with the brake pads required and the moveable element is a corresponding strip, such as a rail in a lift or elevator.

A further advantageous embodiment of the invention is particular in that the energy storage element is a spring, which is pre-stressed to provide a given braking force during clamping. The clamping force has to fulfil certain criteria when the device according to the invention is to be used as a brake, and the skilled designer of a brake will know how to balance friction coefficents, braking times, braking forces and temperature rise.

A use of a brake having the elements according to the invention is particular in a sequence of steps, in a first phase the screw rod is rotated in a first direction so that by means of said at least one further wedge the nut pulls the carriage carrying the at least one roller in such a direction that the long arm of the lever via the short arm of the lever unclamps the moveable element; in a second phase the knee lever mechanism is tripped so that the at least one further wedge disengages from the nut, so that the roller moves in a direction to remove the lever force preventing the biased spring from providing the clamping force; in a third phase the screw rod is rotated in the opposite direction until said further at least one wedge locks the wedge arrangement to the nut, and the knee lever mechanism is brought into a position of rest, in which it may be held by the holder, whereupon the screw rod is again rotated in said first direction, and in an optional fourth phase the screw rod is rotated in the said opposite direction in order to clamp the moveable element slowly by non-tripped application of the force provided by the biased spring element.

It will be seen that the device is capable, not only of tripping for fast braking, but also of "recharging" for the next release of the energy storage as well as of braking and releasing slowly.

The invention will be further described in the following by means of an example relating to a brake.

The embodiment shown is an emergency brake acting on a brake disc. It uses a pre-stressed compression spring as the energy storage, and the brake pads are lifted away from the brake disc by means of links to two parallel levers. The lever fulcrums are at one end, and close to the fulcrums are links to two drawbars that lift the bottom end of the spring to further compress it. These are the short arms of the levers. The long arms of the levers are lifted by means of rollers on a slideable support, because the lever ends are inclined with respect to the line through the fulcrum and the link to the drawbars. The further the rollers are removed from the fulcrum, the higher the compression of the spring. The slideable support is carried by a carriage, which has a nut or nut insert integral to it. A threaded rod may be rotated and move the nut, either in the direction away from the fulcrum, thereby increasing the compression of the spring, or by rotation of the threaded rod in the opposite direction, towards the fulcrum, releasing the spring slowly until the brake pad presses against the brake disc.

However, the connection of the slideable support that carries the rollers to the carriage is not fixed, it is obtained by means of wedges that press into wedge-shaped or oblique cut-outs or "pockets" in the carriage. When the wedges are inside the wedge-shaped cut-outs, there is a connection, and when they have swung out of the cut-outs, the slideable support and the carriage are disconnected. During the step where the spring is further compressed, the wedges are maintained in the cutouts by means of a linkage comprising a knee-lever structure. The knee-lever is not completely straight, because it would then present a column-like resistance to the inwards movement of the wedges. In the present arrangement, the knee-lever structure is biased to collapse because of the inwards force from the wedges created by the pressure of the wedge against the carriage and the oblique surface in the cut-out. The inwards force is derived from the pre-stressed compression spring. To prevent this collapse, the knee is held firm by suitable means, such as an energised electromagnet. Alternatively, the knee may be held by a strap and the other end of strap may be fixed by an extractable pin in a hole. In both cases, either when the electric power is disconnected from the electromagnet or when the pin is pulled, the knee is no longer held in its position, the knee-lever collapses, and the wedges fold inwards to permit the slideable support to slide down under the long arms of the levers, taking the rollers with it, whereupon the spring expands and brakes the brake disc with the force corresponding to its pre-stressing.

Figure 1:
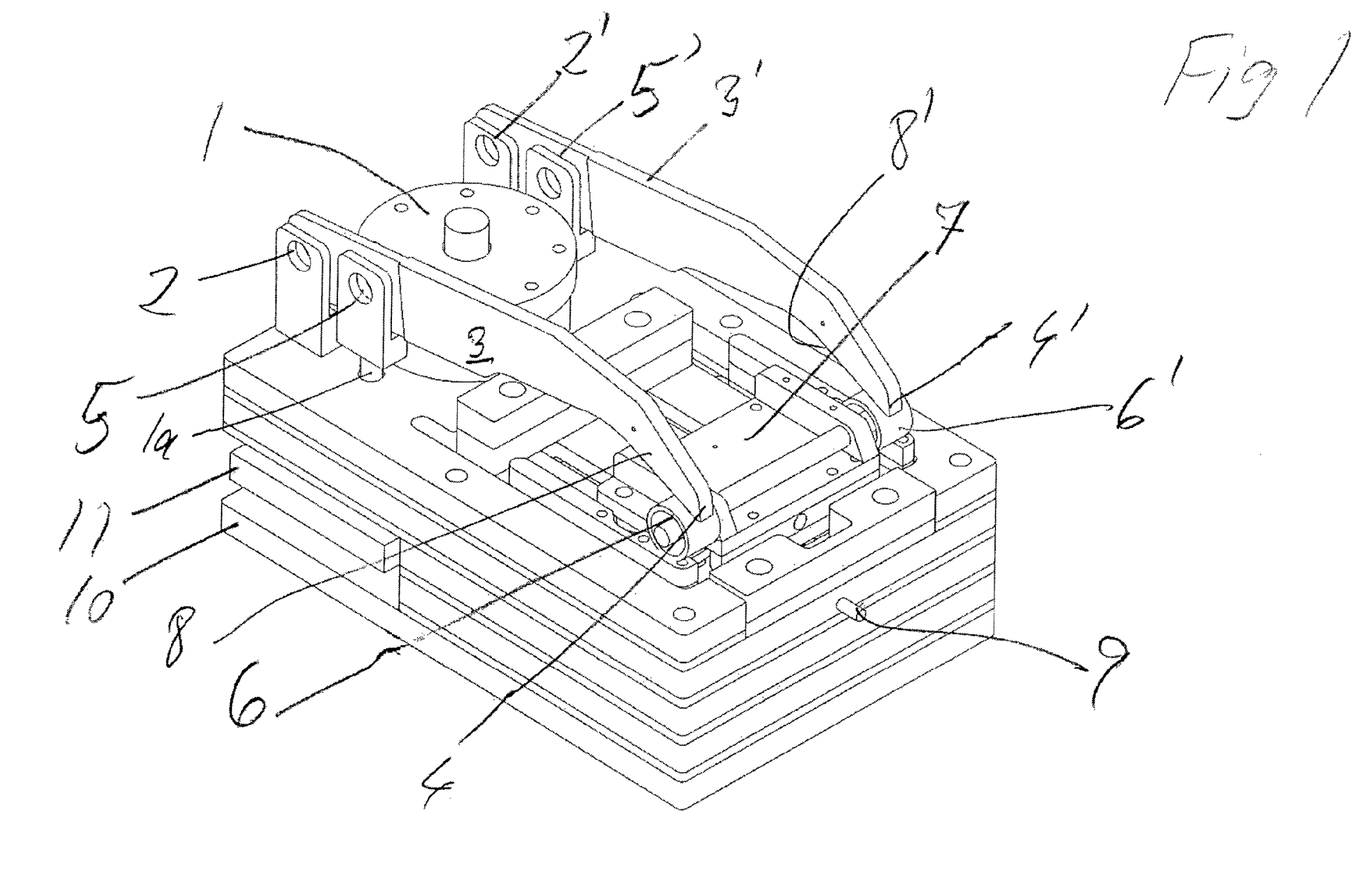
FIG. 1 shows a perspective view of a brake according to the invention

Details of the above are shown in the drawings. FIG. 1 shows the top end of the clamp assembly 1 and the fulcrums 2 and 2' for the levers 3 and 3' extending to the ends 4 and 4'. The levers 3, 3' are provided with holes at the fulcrums 2, 2' and at bearings 5, 5' for pull rods or draw bars 1a, 1b (only that are able to lift the moveable part of a clamp against spring pressure. The active arms of the levers are represented by the unequal distances between 2, 2' and 4, 4' (the long arm) and between 2, 2' and 5, 5' (the short arm). When the ends 4, 4' of the levers 3, 3' are lifted, the moveable part (not shown) of clamp 1 is lifted and its spring is further compressed. The ends 4, 4' are lifted by means of rollers 6, 6' on a shaft placed on a slideable support 7 that may move outwards, whereby interaction with the inclined surfaces 8, 8' on the long arm of the lever causes the lifting. Rollers are used to reduce friction, in particular static friction, when the slideable support 7 is made to move quickly inwards upon tripping. Slow operation of the clamp is possible by moving by means of a suitable screw drive a carriage C (only truly visible in FIG. 6) in its two directions, carrying the slideable support 7; a threaded rod 9 is shown schematically. The whole device is made as a strong and compact construction. The clamping action occurs between a fixed jaw 10 and a moveable jaw 11.

Figure 2:
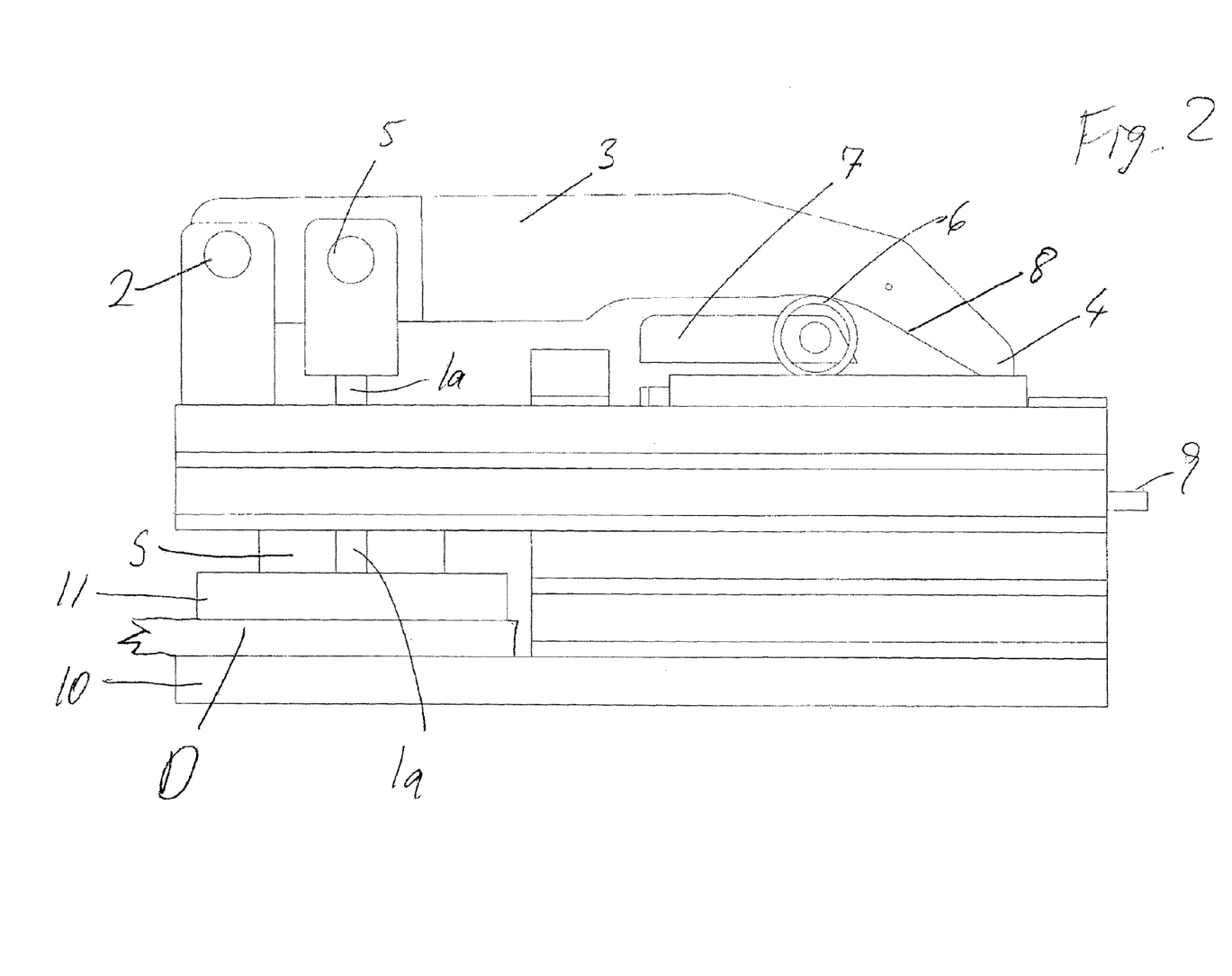
FIG. 2 shows a side view of said brake while effecting a clamping action

FIG. 2 shows a schematic side view of a device according to the invention in one main operational position. The lever 3 is shown with the fulcrum 2 and the bearing 5 for the pull rod 1a that assists in compressing the spring S. The jaws 10 and 11 are as close together as possible, because the clamp is acting with its maximum force (corresponding to the pre-tensioning of the spring) on the element D to be clamped. This corresponds to the leftmost position of the slideable support 7 that carries the roller 6.

Figure 3:
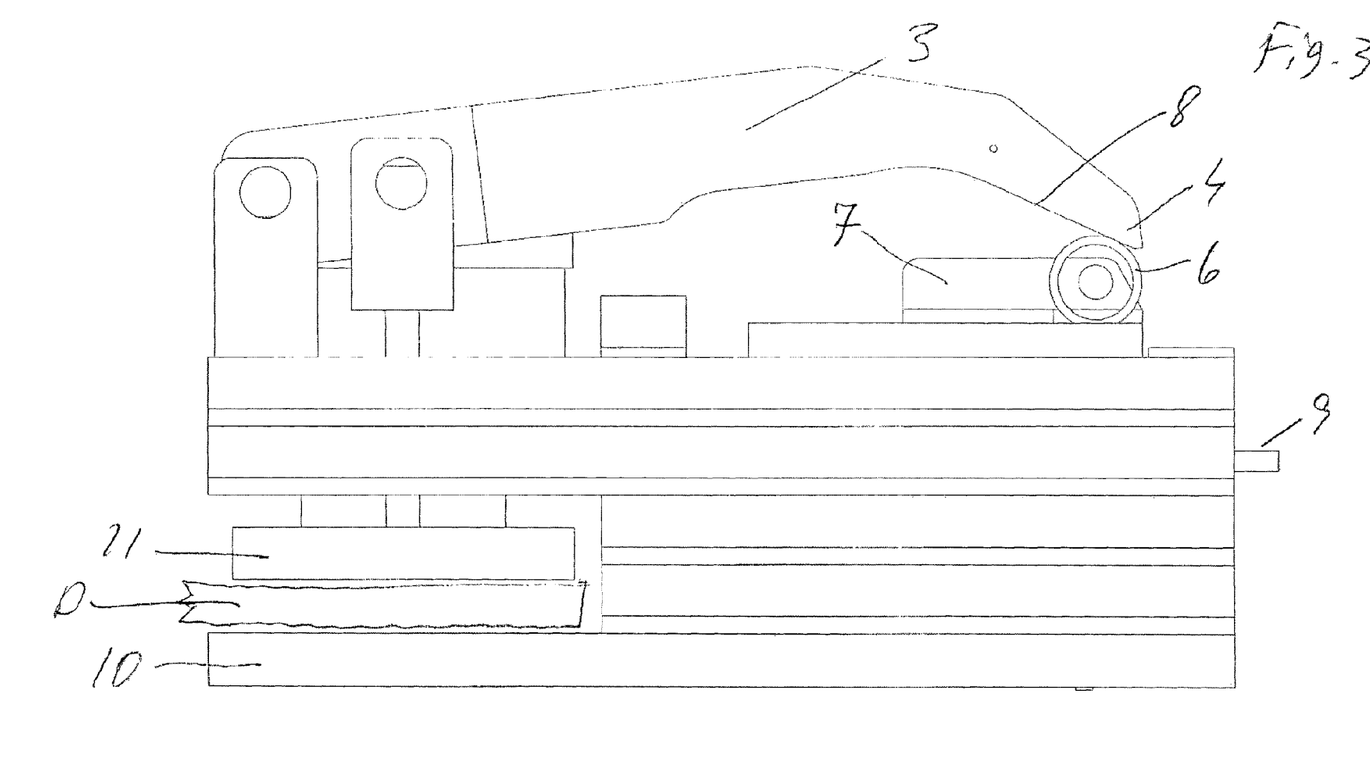
FIG. 3 shows a side view of said brake while not clamping

FIG. 3 shows a schematic side view of a device according to the invention in the other main operational position. The slideable support 7 has been pulled to the right by rotation of the threaded rod 9 cooperating with a nut mounted in the carriage C acting as a support for the slideable support 7, details of which are not shown, and the roller 6 has engaged the inclined surface 8 to lift the tip 4 of the lever 3. The spring S is more compressed than in FIG. 2 because of the pull on the pull rod 1a, and the clamped element D is now free to move because the jaw 11 has moved upwards with respect to the jaw 10.

Figure 4:
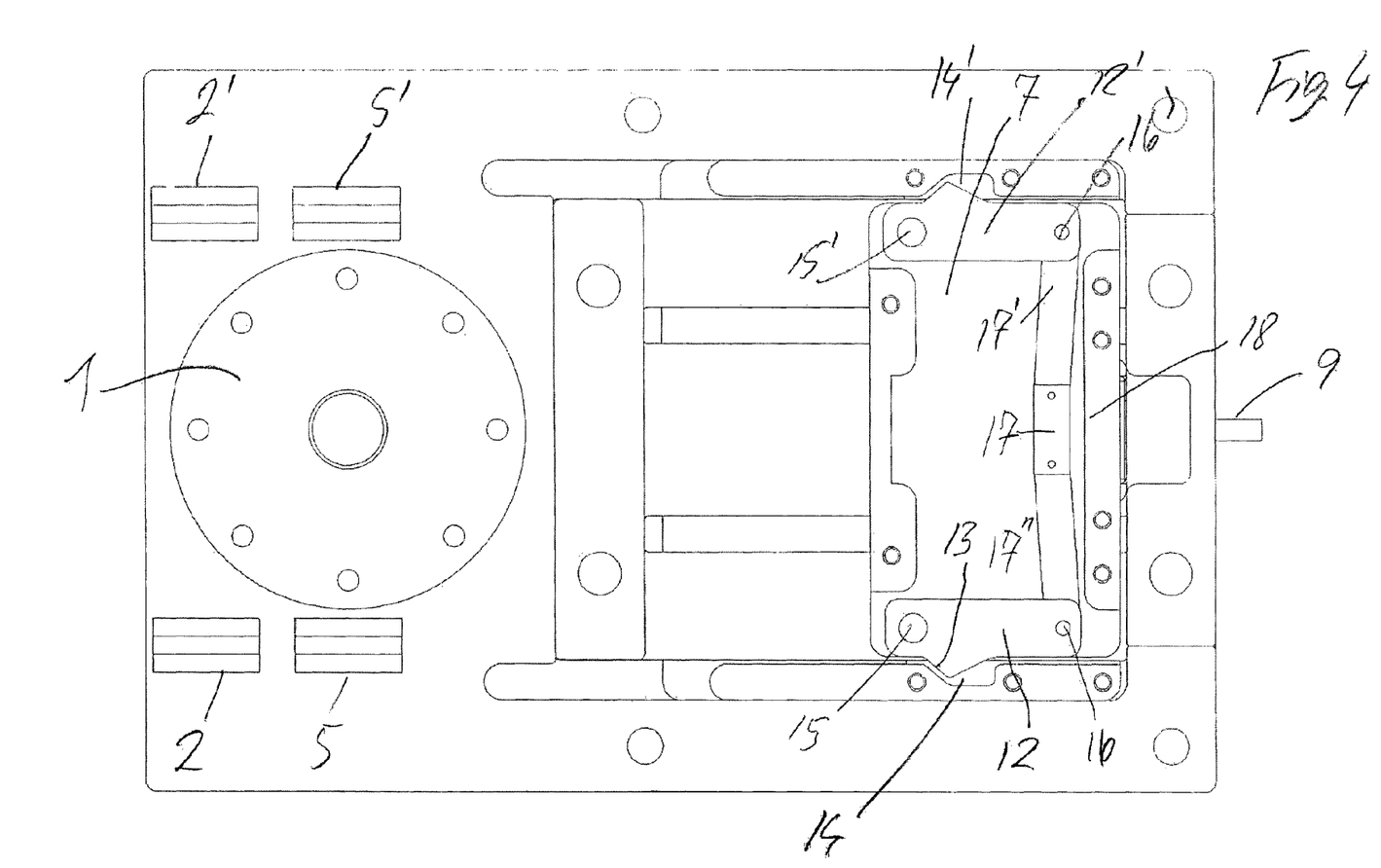
FIG. 4 shows a top view of a tripping mechanism of said brake before tripping.

FIG. 4 shows the tripping mechanism from above, in the position where tripping will cause clamping of the clamped element D. In order that the view is not obscured, the levers 3, 3' and the rollers 6, 6' are not shown. The slideable support 7 carries two swivelable further wedges 12 and 12'. The surfaces interacting in the wedge action are the flanks 13, 13' interacting with corresponding surfaces formed in pockets 14, 14' in the sides of the carriage C. When the wedge surfaces 13, 13' are inside the pockets 14, 14' the slideable support 7 cannot move to the left, because the carriage C is held in its position by the screw rod and nut, and this means that the rollers 6, 6' carried by the slideable support also cannot move. The wedges 12, 12' may swivel on journals 15, 15' if the ends 16, 16' are permitted to move inwards. The knee-lever structure 17, 17', 17" prevents this when the knee 17 is held in the position shown, creating an almost-straight knee-lever structure. Due to the force at the wedge surface interface 13, 13' and pockets 14, 14' the further wedges 12, 12' are urged inwards by a certain force, and the angular relationship of the knee-lever structure 17, 17', 17" reduces this force considerably. The residual force, the holding force, on the knee 17 is taken up by a link, either electromagnetic or mechanical, to the element 18, which is connected to the slideable support 7. There is no fundamental variation in functioning if the force were taken up by another element connected to the physical structure of the clamping device. Once the holding force is no longer supplied, the knee-lever structure collapses due to the inwards forces on the levers 17' and 17", and the mechanism has tripped. The slideable support 7 has been decoupled from the carriage C.

Figure 5:
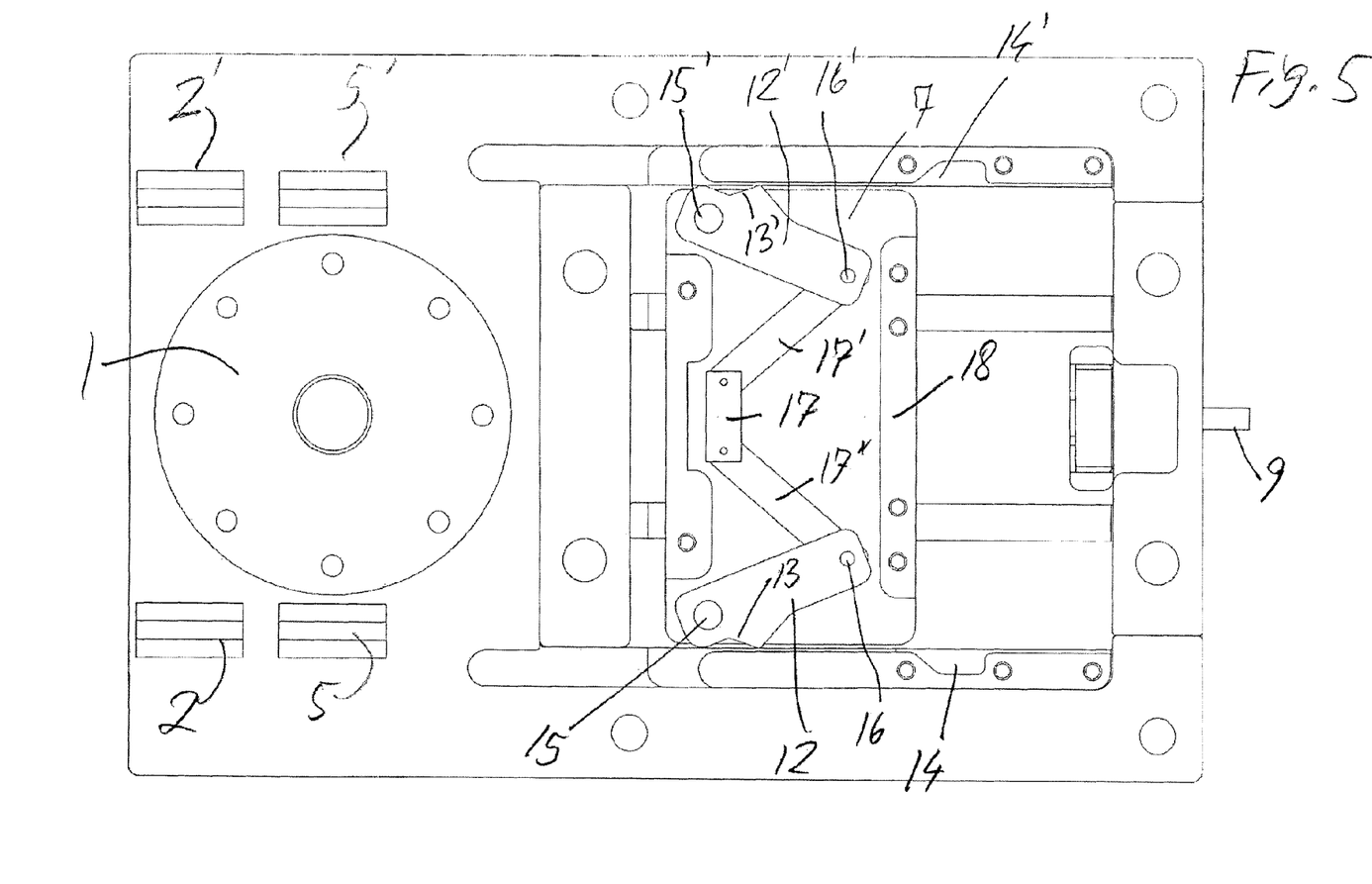
FIG. 5 shows a top view of said tripping mechanism after tripping.

FIG. 5 shows the trip mechanism from above in the tripped state. In order that the view is not obscured, the levers 3, 3' and the rollers 6, 6' are not shown. The collapse of the knee-lever structure 17, 17', 17" has permitted the further wedges 12, 12' to move inwards and out of the pockets 14, 14', and the slideable support 7 has moved to the left under the force provided by the inclined surfaces 8, 8' on the rollers 6, 6'. This movement has caused lowering of the clamp part 11 onto the clamped element D and the support 10, all by means of the force in the energy storage element S. The carriage C is still in its rightmost position, and it will have to be moved to the left by rotating the threaded rod 9, until the further wedges 12, 12' may again engage the pockets 14, 14'.

Figure 6:
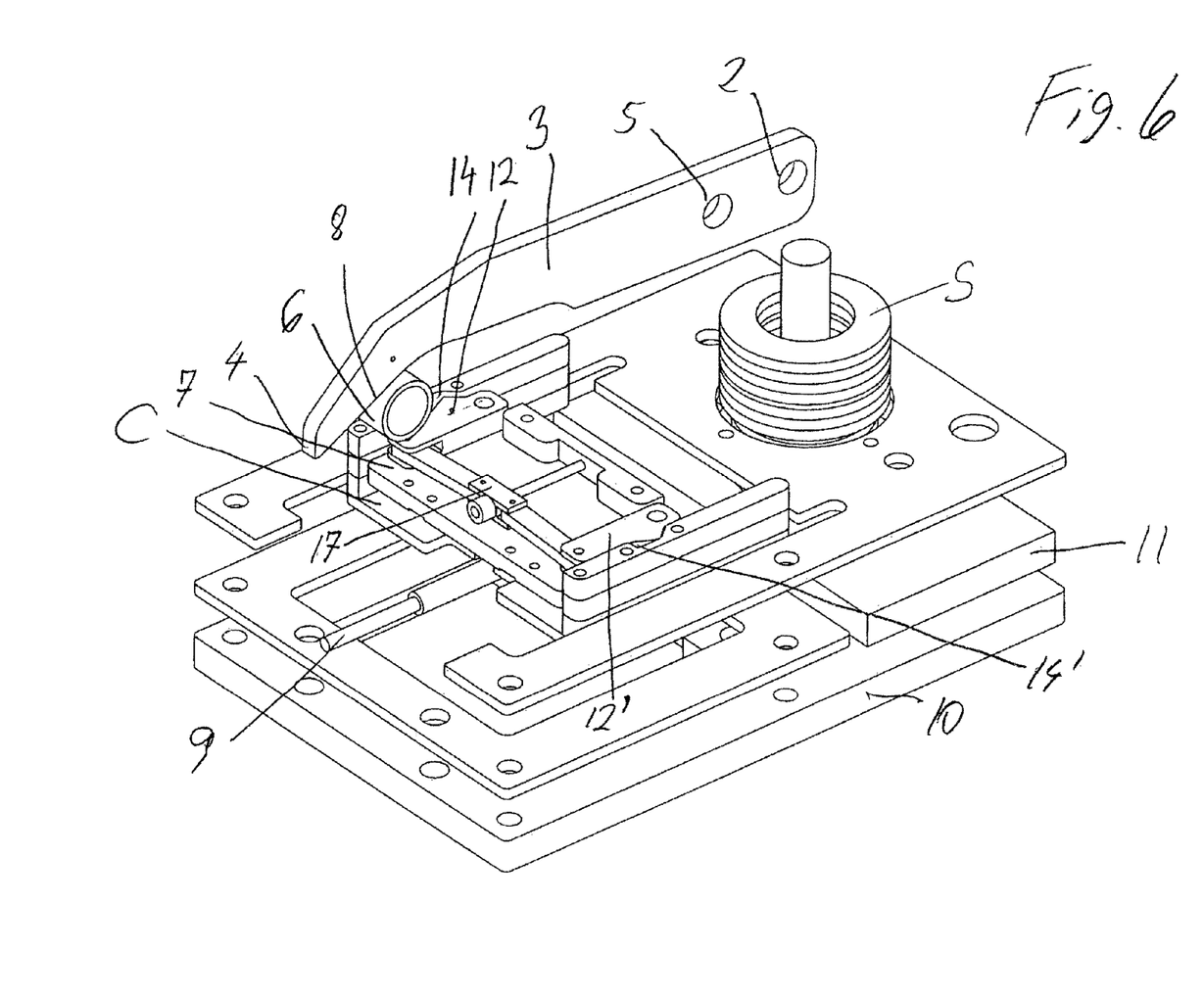
FIG. 6 shows a partly exploded view of elements of the tripping mechanism.

In FIG. 6 a perspective view is shown, seen from the other side than in FIG. 1. The drawing is also partially exploded, and a number of elements have been removed in order to improve the clarity. The lever 3 is shown with its fulcrum 2, and the bearing 5 for the pull rod as well as the spring S are identified. The surface 8 engages the roller 6, but the shaft for the roller is not shown. The position of the slideable support 7 is intermediate between that of FIGS. 1, 3, and 4 and that of FIGS. 2 and 5. The wedges 12, 12' engage the pockets 14, 14'. The threaded rod 9 engages the nut (not shown) that is connected to the carriage C, which is of generally U-shape. The bottom is plane, and the pockets 14, 14' are disposed in the vertical parts of the U. Inside of this U the slideable support 7 is disposed. The slideable support 7 carries all the force of the lever via the inclined surface interacting with the roller 6 (and 6' in the completed clamp), and for this reason it may be expedient to support the slideable support 7 independently from the carriage C. This would not interfere with the wedges engaging the pockets, however.

A further embodiment is not shown, however it differs not in action but in the relative placement of the nut and the rollers. In the embodiment shown, the rollers are fixed to the part carrying the tripping mechanism, and the nut is fixed to the part that carries "pockets" for receiving locking wedges. In the different embodiment (not illustrated), the rollers are carried by the carriage that has "pockets" for receiving locking wedges and is de-coupled from the positioning obtained by means of the tripping mechanism, and the nut is fixed to the part carrying this tripping mechanism. The skilled person is well capable of orienting "pockets" and wedges and their relative angled surfaces to ensure that the forces are transmitted in a manner suitable for obtaining the advantages of the invention.

In the present embodiment, the rollers are shown as fixed to a shaft. However, in a different embodiment, the rollers may be free-rolling between the oblique surface on the lever and another, lower, surface, without any shaft. In this case the movement to create the lifting of the levers occurs by pulling the lower surface in an outwards direction, away from the fulcrum. It may be advantageous to constitute the rollers as pinions, with the upper and lower surfaces being racks. The tripping occurs by releasing the lower surface structure from the carriage.

To sum up, the invention relates to a clamp with a tripping mechanism, in which the force for ensuring safe tripping is obtained via a compound lever mechanism directly from the energy storage element, such as a spring, that provides the clamping force.

The invention claimed is:

1. A device for controlling the application of a clamping force through a clamp to an element (D) that is free to move relative to the clamp when it is not clamped, comprising at least one energy storage element (S) providing the clamping force, a mechanism for opening the clamp comprising at least one element acting as a lever having a short arm and a long arm, in which the long arm is activated by a wedge arrangement comprising a nut moved by a screw rod, and a tripping arrangement causing instant application of the clamping force, wherein the tripping mechanism is biased to trip by means of a force that is directly derived from the energy storage element (S) via said mechanism for opening the clamp.

2. The device according to claim 1, wherein the nut is adapted to be releasably locked to the wedge arrangement.

3. The device according to claim 2, wherein the nut is capable of being locked to a slideable support, which, being a part of the wedge arrangement, is adapted to carry at least one roller for cooperation with an inclined flank on the long arm of the lever.

4. The device according to claim 3, wherein the tripping mechanism comprises at least one further wedge, which is adapted to lock the wedge arrangement to the nut, said at least one further wedge being maintained in its engaged position by an almost straightened-out knee-lever mechanism constituting a collapsible column and adapted to be positively held in its position of rest by a holder that is released when the clamping force is to be applied.

5. The device according to claim 4, wherein the holder for the rest position of the knee lever mechanism is an electromagnet.

6. The device according to claim 4, wherein the holder for the rest position is a strap that connects the knee of the knee lever to a stationary element in the device and having an extractable locking pin in a hole.

7. The device according to claim 1, wherein the clamp element (D) is a brake caliper and the moveable element is a brake disc.

8. The device according to claim 1, wherein the clamp is a brake caliper and the moveable element is a straight and flat bar.

9. The device according to claim 7, wherein the energy storage element (S) is a spring, which is pre-stressed to provide a given braking force during clamping.

10. A method of controlling the application of a clamping force through a clamp having an element (D) that is free to move relative to the clamp when it is not clamped, comprising at least one energy storage element (S) providing the clamping force, a mechanism for opening the clamp comprising at least one element acting as a lever having a short arm and a long arm, in which the long arm is activated by a wedge arrangement comprising a nut moved by a screw rod, and a tripping arrangement causing instant application of the clamping force, the method comprising:
- in a first phase the screw rod is rotated in a first direction so that by means of said at least one further wedge the nut pulls a carriage carrying the at least one roller in such a direction that the long arm of the lever via the short arm of the lever unclamps the moveable element (D)
- in a second phase the knee lever mechanism is tripped so that the at least one further wedge disengages from the nut, so that the at least one roller moves in a direction to remove the lever force preventing the biased spring from providing the clamping force, and
- in a third phase the screw rod is rotated in the opposite direction until said further at least one wedge locks the wedge arrangement to the nut, and the knee lever mechanism is brought into a position of rest, in which it may be held by the holder, whereupon the screw rod is again rotated in said first direction.

11. The method of claim 10 further comprising a fourth phase wherein the screw rod is rotated in the said opposite direction in order to clamp the moveable element (D) slowly by non-tripped application of the force provided by the biased spring.

* * * * *